(12) United States Patent
Bravo et al.

(10) Patent No.: US 8,762,724 B2
(45) Date of Patent: Jun. 24, 2014

(54) WEBSITE AUTHENTICATION

(75) Inventors: Jose Bravo, Mamaroneck, NY (US); Jeffrey L. Crume, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/613,502

(22) Filed: Sep. 13, 2012

(65) Prior Publication Data
US 2013/0007859 A1 Jan. 3, 2013

Related U.S. Application Data

(63) Continuation of application No. 12/423,928, filed on Apr. 15, 2009.

(51) Int. Cl.
*H04L 29/06* (2006.01)

(52) U.S. Cl.
USPC ........... 713/169; 713/168; 713/170; 713/171; 713/172; 713/150; 726/2; 726/3; 726/4; 726/26; 726/27; 380/278; 380/282; 380/283

(58) Field of Classification Search
None
See application file for complete search history.

(56) References Cited

U.S. PATENT DOCUMENTS

| | | |
|---|---|---|
| 4,310,720 A | 1/1982 | Check, Jr. |
| 5,046,082 A | 9/1991 | Zicker et al. |
| 5,068,894 A | 11/1991 | Hoppe |
| 5,323,465 A | 6/1994 | Avarne |
| 5,457,737 A | 10/1995 | Wen |
| 5,491,752 A | 2/1996 | Kaufman et al. |
| 5,497,411 A | 3/1996 | Pellerin |
| 5,647,388 A | 7/1997 | Butler, Jr. et al. |
| 5,657,388 A | 8/1997 | Weiss |
| 5,684,950 A | 11/1997 | Dare et al. |
| 5,701,339 A | 12/1997 | Suda |
| 5,749,052 A | 5/1998 | Hidem et al. |
| 5,841,871 A | 11/1998 | Pinkas |
| 5,842,124 A | 11/1998 | Kenagy et al. |
| 5,892,902 A | 4/1999 | Clark |
| 5,953,422 A | 9/1999 | Angelo et al. |
| 5,971,272 A | 10/1999 | Hsiao |
| 6,000,031 A | 12/1999 | Bingaman et al. |
| 6,169,890 B1 | 1/2001 | Vatanen |
| 6,278,863 B1 | 8/2001 | Mabrouki |

(Continued)

FOREIGN PATENT DOCUMENTS

| | | |
|---|---|---|
| DE | 10317176 A1 | 11/2004 |
| EP | 1119147 A1 | 7/2001 |

(Continued)

OTHER PUBLICATIONS

Zia, Notice of Allowance and Fee(s) Due for U.S. Appl. No. 12/423,928 dated Dec. 4, 2012, 19 pages.

(Continued)

*Primary Examiner* — Michael R Vaughan
(74) *Attorney, Agent, or Firm* — Douglas A. Lashmit; Hoffman Warnick LLC

(57) ABSTRACT

Embodiments of website authentication including receiving a request from a user to view a website within a graphical user interface (GUI); generating a one time password (OTP); storing the generated OTP in a database; displaying the generated OTP on the GUI; verifying an identity of the user by receiving an identification datum from a communication device; receiving an entered OTP from the user; comparing the entered OTP with the generated OTP; and communicating whether the website is authenticated.

10 Claims, 2 Drawing Sheets

(56) References Cited

U.S. PATENT DOCUMENTS

| | | |
|---|---|---|
| 6,308,268 B1 | 10/2001 | Audebert |
| 6,324,271 B1 | 11/2001 | Sawyer et al. |
| 6,330,608 B1 | 12/2001 | Stiles |
| 6,334,056 B1 | 12/2001 | Holmes et al. |
| 6,338,140 B1 | 1/2002 | Owens et al. |
| 6,349,134 B1 | 2/2002 | Katz |
| 6,385,729 B1 | 5/2002 | DiGiorgio et al. |
| 6,387,729 B2 | 5/2002 | Eng et al. |
| 6,393,468 B1 | 5/2002 | McGee |
| 6,400,726 B1 | 6/2002 | Piret et al. |
| 6,466,780 B1 | 10/2002 | Geiselman et al. |
| 6,535,726 B1 | 3/2003 | Johnson |
| 6,584,309 B1 | 6/2003 | Whigham |
| 6,687,241 B1 | 2/2004 | Goss |
| 6,707,915 B1 | 3/2004 | Jobst et al. |
| 6,731,731 B1 | 5/2004 | Ueshima |
| 6,993,658 B1 | 1/2006 | Engberg et al. |
| 6,993,663 B1 | 1/2006 | Paya et al. |
| 7,007,301 B2 | 2/2006 | Crosbie et al. |
| 7,024,688 B1 | 4/2006 | Faccin et al. |
| 7,028,179 B2 | 4/2006 | Anderson et al. |
| 7,058,796 B2 | 6/2006 | Lynn et al. |
| 7,058,968 B2 | 6/2006 | Rowland et al. |
| 7,100,204 B1 | 8/2006 | Myllymaki et al. |
| 7,133,662 B2 | 11/2006 | Bravo et al. |
| 7,142,840 B1 | 11/2006 | Geddes et al. |
| 7,221,949 B2 | 5/2007 | Clough |
| 7,290,278 B2 | 10/2007 | Cahill et al. |
| 7,317,693 B1 | 1/2008 | Roesch et al. |
| 7,324,976 B2 | 1/2008 | Gupta et al. |
| 7,337,431 B1 | 2/2008 | Barnes et al. |
| 7,357,310 B2 | 4/2008 | Calabrese et al. |
| 7,360,248 B1 | 4/2008 | Kanevsky et al. |
| 7,376,431 B2 | 5/2008 | Niedermeyer |
| 7,379,921 B1 | 5/2008 | Kiliccote |
| 7,380,708 B1 | 6/2008 | Kiliccote |
| 7,447,494 B2 | 11/2008 | Law et al. |
| 7,480,805 B1 | 1/2009 | Gnech et al. |
| 7,491,308 B2 | 2/2009 | Talieh et al. |
| 7,519,989 B2 | 4/2009 | Lin et al. |
| 7,533,414 B1 | 5/2009 | Reed et al. |
| 7,536,634 B2 | 5/2009 | Green et al. |
| 7,540,022 B2 | 5/2009 | Barari et al. |
| 7,594,270 B2 | 9/2009 | Church et al. |
| 7,600,676 B1 | 10/2009 | Rados et al. |
| 7,609,625 B2 | 10/2009 | Wei et al. |
| 7,623,458 B2 | 11/2009 | Ayyagari et al. |
| 7,624,447 B1 | 11/2009 | Horowitz et al. |
| 7,665,128 B2 | 2/2010 | Yang |
| 7,673,334 B2 | 3/2010 | Takemori et al. |
| 7,715,823 B2 | 5/2010 | Bravo et al. |
| 7,716,742 B1 | 5/2010 | Roesch et al. |
| 7,757,285 B2 | 7/2010 | Kubota |
| 7,765,584 B2 | 7/2010 | Roskind |
| 7,779,465 B2 | 8/2010 | Baker et al. |
| 7,823,199 B1 | 10/2010 | Rathi et al. |
| 7,840,993 B2 | 11/2010 | Ganesan et al. |
| 7,845,004 B2 | 11/2010 | Bardsley et al. |
| 7,886,346 B2 | 2/2011 | Sandhu et al. |
| 7,926,108 B2 | 4/2011 | Rand et al. |
| 7,954,150 B2 | 5/2011 | Croft et al. |
| 7,975,293 B2 | 7/2011 | Yoshida et al. |
| 8,019,995 B2 | 9/2011 | van Bemmel |
| 8,024,567 B2 | 9/2011 | Han |
| 8,050,658 B2 | 11/2011 | Hong |
| 8,060,915 B2 | 11/2011 | Voice et al. |
| 8,136,150 B2 | 3/2012 | Hayler et al. |
| 8,150,370 B2 | 4/2012 | Dempo et al. |
| 8,151,327 B2 | 4/2012 | Eisen |
| 8,181,248 B2 | 5/2012 | Oh et al. |
| 8,201,217 B1 | 6/2012 | Begen et al. |
| 8,254,542 B2 | 8/2012 | Frederick |
| 8,281,375 B2 | 10/2012 | von Krogh |
| 8,285,639 B2 | 10/2012 | Eden et al. |
| 8,296,823 B2 | 10/2012 | Schubert |
| 8,301,877 B2 | 10/2012 | Grajek et al. |
| 8,302,180 B1 | 10/2012 | Gudov et al. |
| 8,302,187 B1 | 10/2012 | Gupta et al. |
| 2001/0054155 A1 | 12/2001 | Hagan et al. |
| 2002/0069165 A1 | 6/2002 | O'Neil et al. |
| 2002/0091931 A1 | 7/2002 | Quick et al. |
| 2002/0095588 A1 | 7/2002 | Shigematsu et al. |
| 2002/0178070 A1 | 11/2002 | Leveridge |
| 2002/0178370 A1 | 11/2002 | Gurevich et al. |
| 2003/0014315 A1 | 1/2003 | Jaalinoja et al. |
| 2003/0154382 A1 | 8/2003 | Vicard |
| 2003/0172272 A1 | 9/2003 | Ehlers et al. |
| 2004/0148520 A1 | 7/2004 | Talpade et al. |
| 2004/0152446 A1 | 8/2004 | Saunders et al. |
| 2004/0198329 A1 | 10/2004 | Vasa |
| 2004/0243856 A1 | 12/2004 | Shatford |
| 2005/0015624 A1 | 1/2005 | Ginter et al. |
| 2005/0018618 A1 | 1/2005 | Mualem et al. |
| 2005/0022020 A1 | 1/2005 | Fremberg |
| 2005/0060535 A1 | 3/2005 | Bartas |
| 2005/0075070 A1 | 4/2005 | Crilly, Jr. |
| 2005/0182958 A1 | 8/2005 | Pham et al. |
| 2005/0187934 A1 | 8/2005 | Motsinger et al. |
| 2005/0188423 A1 | 8/2005 | Motsinger et al. |
| 2005/0210251 A1 | 9/2005 | Nyberg et al. |
| 2006/0021031 A1 | 1/2006 | Leahy et al. |
| 2006/0036690 A1 | 2/2006 | O'Neil |
| 2006/0094403 A1 | 5/2006 | Norefors et al. |
| 2006/0095955 A1 | 5/2006 | Vong |
| 2006/0179304 A1 | 8/2006 | Han |
| 2006/0248021 A1 | 11/2006 | Jain et al. |
| 2006/0288411 A1 | 12/2006 | Garg et al. |
| 2007/0015492 A1 | 1/2007 | Bravo et al. |
| 2007/0067828 A1 | 3/2007 | Bychkov |
| 2007/0083606 A1 | 4/2007 | Malik et al. |
| 2007/0084913 A1 | 4/2007 | Weston |
| 2007/0107050 A1 | 5/2007 | Selvarajan |
| 2007/0136573 A1 | 6/2007 | Steinberg |
| 2007/0136808 A1 | 6/2007 | Xiong |
| 2007/0143851 A1 | 6/2007 | Nicodemus et al. |
| 2007/0186099 A1 | 8/2007 | Beck et al. |
| 2007/0220275 A1 | 9/2007 | Heitzeberg et al. |
| 2007/0234426 A1 | 10/2007 | Khanolkar et al. |
| 2007/0261112 A1 | 11/2007 | Todd et al. |
| 2007/0266257 A1 | 11/2007 | Camaisa et al. |
| 2008/0028447 A1 | 1/2008 | O'Malley et al. |
| 2008/0172730 A1 | 7/2008 | Sandhu et al. |
| 2008/0181380 A1 | 7/2008 | Gustave et al. |
| 2008/0189776 A1 | 8/2008 | Constable |
| 2008/0209275 A1 | 8/2008 | Kwan et al. |
| 2008/0270301 A1 | 10/2008 | Jones et al. |
| 2008/0281737 A1 | 11/2008 | Fajardo |
| 2008/0318548 A1 | 12/2008 | Bravo et al. |
| 2009/0037329 A1 | 2/2009 | Coppinger et al. |
| 2009/0077637 A1 | 3/2009 | Santos et al. |
| 2009/0094682 A1 | 4/2009 | Sage et al. |
| 2009/0095588 A1 | 4/2009 | Thomas |
| 2009/0104889 A1 | 4/2009 | Lotvonen et al. |
| 2009/0106138 A1 | 4/2009 | Smith et al. |
| 2009/0300738 A1 | 12/2009 | Dewe et al. |
| 2010/0024017 A1 | 1/2010 | Ashfield et al. |
| 2010/0051686 A1 | 3/2010 | Obi |
| 2010/0095351 A1 | 4/2010 | Liu et al. |
| 2010/0269162 A1 | 10/2010 | Bravo et al. |
| 2011/0015449 A1 | 1/2011 | Pendleton et al. |
| 2011/0039237 A1 | 2/2011 | Skare |
| 2011/0138483 A1 | 6/2011 | Bravo et al. |
| 2011/0197070 A1 | 8/2011 | Mizrah |
| 2011/0225647 A1 | 9/2011 | Dilley et al. |
| 2011/0277024 A1 | 11/2011 | Begley et al. |
| 2011/0289576 A1 | 11/2011 | Cheng |
| 2011/0307366 A1 | 12/2011 | Ahuja et al. |
| 2012/0011066 A1 | 1/2012 | Telle et al. |
| 2012/0149334 A1 | 6/2012 | Zhang et al. |
| 2012/0204241 A1 | 8/2012 | Varsavsky Waisman-Diamond et al. |
| 2012/0264405 A1 | 10/2012 | Bravo |
| 2012/0272331 A1 | 10/2012 | Lemaster et al. |
| 2013/0007859 A1 | 1/2013 | Bravo et al. |

(56) References Cited

U.S. PATENT DOCUMENTS

| | | | |
|---|---|---|---|
| 2014/0011561 | A1 | 1/2014 | Lutnick et al. |
| 2014/0016634 | A1 | 1/2014 | Khan et al. |
| 2014/0033279 | A1 | 1/2014 | Nimashakavi et al. |

FOREIGN PATENT DOCUMENTS

| | | |
|---|---|---|
| GB | 2456509 A | 7/2009 |
| JP | 10334048 | 12/1998 |
| JP | 10341224 | 12/1998 |
| JP | 20011111545 | 4/2001 |
| WO | 0109808 A1 | 8/2001 |
| WO | 2004079499 A2 | 9/2004 |
| WO | 2006103387 A1 | 10/2006 |
| WO | 2008147353 A1 | 12/2008 |

OTHER PUBLICATIONS

Ma et al., "Beyond Blacklists: Learning to Detect Malicious Web Sites from Suspicious URLs", KDD '09, Jul. 28-Jul. 1, 2009, pp. 1245-1253.
Lakhia, U.S. Appl. No. 13/432,956, Notice of Allowance & Fees Due, Apr. 15, 2013, 27 pages.
Bibbee, U.S. Appl. No. 11/765,193, Examiner's Answer, Apr. 16, 2013, 20 pages.
Almeida, U.S. Appl. No. 12/630,875, Office Action, Apr. 17, 2013, 40 pages.
Lakhia, U.S. Appl. No. 11/753,673, Notice of Allowance & Fees Due, dated May 10, 2013, 28 pages.
Kumaraguru et al., "Getting Users to Pay Attention to Anti-Phishing Education: Evaluation of Retention and Transfer", APWG eCrime Researchers Summit, Oct. 4-5, 2007, pp. 70-81, Pittsburgh, PA.
Ben Adida, "Beamauth: Two-Factor Web Authentication With a Bookmark"; CCS, Oct. 29-Nov. 2, 2007, pp. 48-57, Alexandria, VA.
Nassar et al., "Holistic VoIP Instrusion Detection and Prevention System", IPTCOMM, 2007, pp. 1-9, New York.
Stoll et al., "Sesame: Informing User Security Decisions With System Visualization", CHI, Apr. 5-10, 2008, pp. 1045-1054, Florence Italy.
Sharief Abdel Megeed, USPTO Office Action, U.S. Appl. No. 12/423,928, Notification Date Aug. 25, 2011, 21 pages.
Sharief Abdel Megeed, USPTO Final Office Action, U.S. Appl. No. 12/423,928, Notification Date Nov. 10, 2011, 20 pages.
Syed Zia, USPTO Office Action, U.S. Appl. No. 12/423,928, Notification Date Jun. 8, 2012, 20 pages.
Syed Zia, USPTO Notice of Allowance and Fee(s) Due, U.S. Appl. No. 12/423,928, Date Mailed Sep. 25, 2012, 10 pages.
Lakhia, Office Action Communication for U.S. Appl. No. 11/753,673 dated Oct. 8, 2010, 13 pages.
Lakhia, Office Action Communication for U.S. Appl. No. 11/753,673 dated Apr. 15, 2010, 13 pages.
Lakhia, Office Action Communication for U.S. Appl. No. 11/753,673 dated Dec. 22, 2011, 15 pages.
Lakhia, Notice of Allowance and Fee(s) Due for U.S. Appl. No. 11/753,673 dated Jun. 18, 2012, 11 pages.
Bibbee, Office Action Communication for U.S. Appl. No. 11/765,193 dated Apr. 16, 2012, 18 pages.
Bibbee, Office Action Communication for U.S. Appl. No. 11/765,193 dated Sep. 19, 2011, 18 pages.
Bibbee, Office Action Communication for U.S. Appl. No. 11/765,193 dated May 21, 2011, 17 pages.
Bibbee, Office Action Communication for U.S. Appl. No. 11/765,193 dated Nov. 29, 2010, 14 pages.
Bibbee, Office Action Communication for U.S. Appl. No. 11/765,193 dated Jul. 30, 2010, 15 pages.
Bibbee, Office Action Communication for U.S. Appl. No. 11/765,193 dated Feb. 18, 2010, 15 pages.
Geneiatakis et al., "Survey of Security Vulnerabilities in Session Initiation Protocol," 2006, pp. 68-81, IEEE Communications Surveys, vol. 8, No. 3.
Deng et al., "Defending Against Redirect Attacks in Mobile IP," Nov. 2002, pp. 59-67, CCS 2002.
Juels, "Strengthening EPC Tags Against Cloning," Sep. 2005, pp. 67-75, WiSE 2005.
Kaafar et al., "Real attacks on virtual networks: Vivaldi out of tune," Sep. 2006, pp. 139-146, SIGCOMM 2006 Workshops.
Lee et al., "A Resilient Packet-Forwarding Scheme Against Maliciously Packet-Dropping Nodes in Sensor Networks," Oct. 2006, pp. 59-69, SASN 2006.
Lakhia, U.S. Appl. No. 11/753,673, Notice of Allowance, Aug. 21, 2012, 7 pages.
Tran, U.S. Appl. No. 11/524,340, Notice of Allowance, Dec. 29, 2009, 11 pages.
Tran, U.S. Appl. No. 11/524,340, Office Action, Jul. 29, 2009, 9 pages.
Tran, U.S. Appl. No. 11/524,340, Office Action, Oct. 31, 2008, 19 pages.
Tran, U.S. Appl. No. 11/524,340, Office Action, May 27, 2008, 22 pages.
Tran, U.S. Appl. No. 11/524,340, Office Action, Apr. 29, 2009, 7 pages.
Lakhia, U.S. Appl. No. 11/753,673, Notice of Allowance, Jan. 8, 2013, 14 pages.
"Prevent Online Banking Fraud", Dec. 7, 2010, http://www.phonefactor.com/products/transaction-verification, 1 page.
Bonzo, U.S. Appl. No. 11/776,619, Office Action, Sep. 30, 2009, 12 pages.
Bonzo, U.S. Appl. No. 11/776,619, Notice of Allowance, Apr. 29, 2010, 10 pages.
Alicherry et al., Double Check: Multi-path Verification Against Man-in-the-Middle Attacks, 2009 IEEE, pp. 557-563.
Koo et al., "VoIP Interception in P2P SIP Environment", 2010 IEEE, vol. 1, pp. 331-334.
Kopsidas et al., "Voice Interactive Personalized Security (VoIPSEC) protocol: Fortify Internet telephony by providing end-to-end security through inbound key exchange and biometric verification", 1-4244-0595-5 /06/$20.00 © 2006 IEEE, 10 pgs.
Leung, "Depress Phishing by CAPTCHA with OTP", The Chinese University of Hong Kong, 2009, ASID, Aug. 20-22, 2009, 6 pgs.
Nassar et al., Holistic VoIP Intrusion Detection and Prevention System, IPTCOMM '07, ACM 2007, 9 pgs.
Almeida, U.S. Appl. No. 12/630,875, Office Action, Mar. 1, 2012, 17 pages.
Almeida, U.S. Appl. No. 12/630,875, Office Action, Aug. 30, 2012, 14 pages.
Almeida, U.S. Appl. No. 12/630,875, Notice of Allowance, Dec. 20, 2012, 7 pages.
Lakhia, U.S. Appl. No. 13/432,956, Office Action, Feb. 14, 2013, 26 pages.
Gee, U.S. Appl. No. 13/084,823, Office Action, Mar. 11, 2013, 8 pages.
Gee, U.S. Appl. No. 13/084,823, Office Action Communication, Jul. 19, 2013, 24 pages.
Almeida, U.S. Appl. No. 12/630,875, Office Action Communication, Aug. 7, 2013, 15 pages.
U.S. Appl. No. 12/630,875, Notice of allowance and Fee(s) Due dated Nov. 18, 2013, IBMC-0353, 19 pages.
Vaughan, U.S. Appl. No. 12/423,928, Notice of Allowance & Fees Due, Jul. 11, 2013, 25 pages.
U.S. Appl. No. 13/084,826, Office Action dated Feb. 3, 2014, IBMC-0395, 12 pages.
U.S. Appl. No. 13/562,491, Office Action dated May 5, 2014, 64 pages.
U.S. Appl. No. 13/084,823, Notice of Allowance and Fees Due, May 1, 2014, 16 pages.

WEBSITE AUTHENTICATION

This application is a continuation application of co-pending U.S. patent application Ser. No. 12/423,928, filed on Apr. 15, 2009, which is hereby incorporated herein.

FIELD OF THE INVENTION

The present invention relates generally to website authentication, and more particularly to website authentication using a one time password and a voice response unit.

BACKGROUND OF THE INVENTION

Computers and other devices, as well as secure facilities, services and financial accounts, often contain proprietary, personal and/or sensitive information, which could be compromised if accessed by unauthorized individuals. Thus such devices, facilities, services and accounts (hereinafter "restricted items") often incorporate security techniques, such as database access control mechanisms, to prevent unauthorized users from accessing, obtaining, or altering the proprietary, personal and/or sensitive information. Authentication techniques allow users to prove their identity and obtain authorized access to a given restricted item.

In a phishing attack, a user is tricked into providing login credentials and/or sensitive information by an attacker impersonating an authentic website. The reason the attack succeeds is that the user is unable to determine whether the website is authentic or fake. Most existing defenses require the user to discern an authentic from fake website based upon the overall appearance of the website, a specially chosen website authentication image, or verification of the website's digital certification. Appearances may be imitated by the attacker or overlooked by the user.

Website authentication, either in addition to or as an alternative to appearance based defenses against phishing attacks, improves security for both users and the entities that utilize websites in communicating with users.

SUMMARY OF THE INVENTION

The present invention provides a method, system and program product to improve website authentication. In particular, the present invention allows users to authenticate the website that they are visiting.

In a first aspect, the invention provides a method for website authentication, using at least one computer hardware device for performing the steps of: receiving a request from a user to view a website within a graphical user interface (GUI); generating a one time password (OTP); storing the generated OTP in a database; displaying the generated OTP on the GUI; verifying an identity of the user by receiving an identification datum from a communication device; receiving an entered OTP from the user; comparing the entered OTP with the generated OTP; and communicating whether the website is authenticated.

In a second aspect, the invention provides a website authentication system, including a computer hardware device comprising: a one time password (OTP) generator system for generating a OTP; a voice response unit (VRU) system for receiving at least one identification datum from a communication device; a user verification system for verifying an identity of the user by receiving an identification datum from the communication device; a comparison system for receiving an entered OTP from the user and comparing the entered OTP with the generated OTP; and a security alert system for communicating whether the website is authenticated.

In a third aspect, the invention provides a computer readable medium storing a program product for website authentication, comprising: program code for receiving a request from a user to view a website within a graphical user interface (GUI); program code for generating a one time password (OTP); program code for storing the generated OTP in a database; program code for displaying the generated OTP on the GUI; program code for verifying an identity of the user by receiving an identification datum from a communication device; program code for receiving an entered OTP from the user; program code for comparing the entered OTP with the generated OTP; and program code for communicating whether the website is authenticated.

BRIEF DESCRIPTION OF THE DRAWINGS

The above and other objects, features and advantages of the invention will be better understood by reading the following more particular description of the invention in conjunction with the accompanying drawings.

Figure 1:
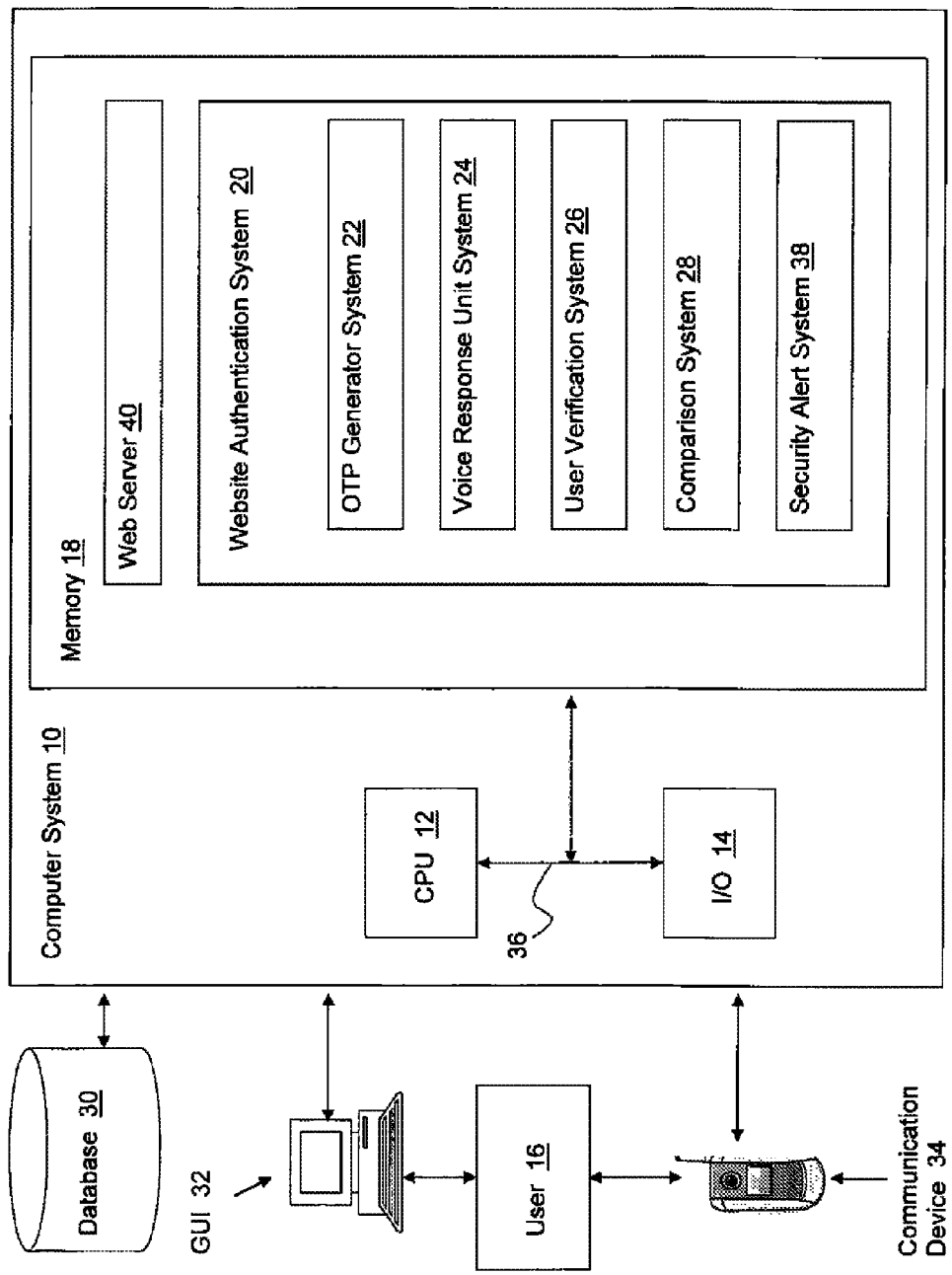
FIG. 1 depicts one embodiment of a website authentication system in accordance with this invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

FIG. 1 shows an illustrative embodiment of the invention in which a computer system 10 having a web server 40 provides web pages to a user 16 via a graphical user interface (GUI) 32. In addition to web server 40, a website authentication system 20 is also provided to allow user 16 to authenticate content allegedly being served from web server 40. Website authentication system 20, as well as web server 40, may be implemented as a software program product that can be stored in memory 18 and be executed on any type of computer system 10. A person skilled in the art will recognize that the invention may be implemented on one or more computer systems and this disclosure is not intended to limit such potential embodiments. In this illustrative embodiment, website authentication system 20 includes a one time password (OTP) generator system 22; a voice response unit (VRU) system 24; a user verification system 26; a comparison system 28; and a security alert system 38.

In operation, website authentication system 20 receives a request from the user 16 to view a website on the GUI 32. An input/output (I/O) system 14 is provided on the computer system 10 for communications with the user 16 via GUI 32 and/or a communication device 34. Communication device 34 may be implemented using any type of communication device including, for example, a telephone, a cell phone, a personal digital assistant (PDA) and a radio. GUI 32 may be implemented using any type of device or software that permits website access including, for example, a browser, a desktop computer, a laptop computer, a PDA, a cell phone. GUI 32 and communication device 34 may reside on different devices or the same device.

OTP generator system 22 generates a one time password (OTP) when the user 16 attempts to view the website. The generated OTP may include at least one number, letter, and other symbol. In one embodiment of the invention, the generated OTP is limited to numeric digits for easy phone keypad entry. The generated OTP is stored in a database 30 and displayed on the GUI 32.

Once displayed, user 16 reads the generated OTP from the GUI 32 which can then be used to authenticate the website via the communication device 34. As used herein "reads" means accesses the generated OTP by visual, audio, tactile or any other communication method between GUI 32 and user 16.

At some point after the OTP is generated, voice response unit system (VRU) 24 receives a communication, e.g., a telephone call, from user 16 by communication device 34. In one embodiment, a VRU phone number is previously communicated to user 16 through a communication channel other than the website thereby preventing the phishing attack from posting a fake VRU phone number. VRU 24 may receive an identification datum from the communication device 34. The identification datum may include an identification datum automatically generated by the communication device or an identification datum input by the user 16. The identification datum may include a caller ID, an account number, a password or a first geographical location. VRU may prompt user 16 to enter identification datum over the communication device 34, e.g., via a key pad, by speaking, etc.

User verification system 26 can verify an identity of the user 16 in a number of ways. In one approach, user verification system 26 may verify the user 16 by comparing at least one identification datum with a previously stored identification datum in the database. User verification system 26 may determine a second geographical location by detecting the location of the GUI 32 where the request from the user to view the website was made and then store the second geographical location in the database 30. In another approach, user verification system 26 may verify the user 16 by comparing the first geographical location with the second geographical location. If user's 16 identity cannot be verified, user verification system 26 notifies voice response unit 24 to terminate the communication and notifies the security alert system 38 of a failed user verification attempt.

If user's 16 identity is verified, user 16 enters the OTP that user reads from the GUI 32. Comparison system 28 receives the entered OTP from the user 16. Comparison system 28 compares the entered OTP with the generated OTP in the database 30.

If the entered OTP matches the generated OTP, then website authentication system 20 communicates to the user 16 that the website being viewed by the user 16 is authentic. If the entered OTP does not match the generated OTP, then website authentication system 20 communicates to the user 16 via the communication device 34 that the website being viewed by the user is fake. In one embodiment, if the entered OTP does not match the generated OTP, comparison system notifies the security alert system 38 that a fake website has been detected.

In one embodiment if a fake website is detected, security alert system 38 may store the fake website in the database 30. Storing the fake website may include storing information about the fake website including the website address of the fake website and html coding of the fake website. Security alert system 38 may notify an authentic website administrator of the report of the fake website.

Figure 2:
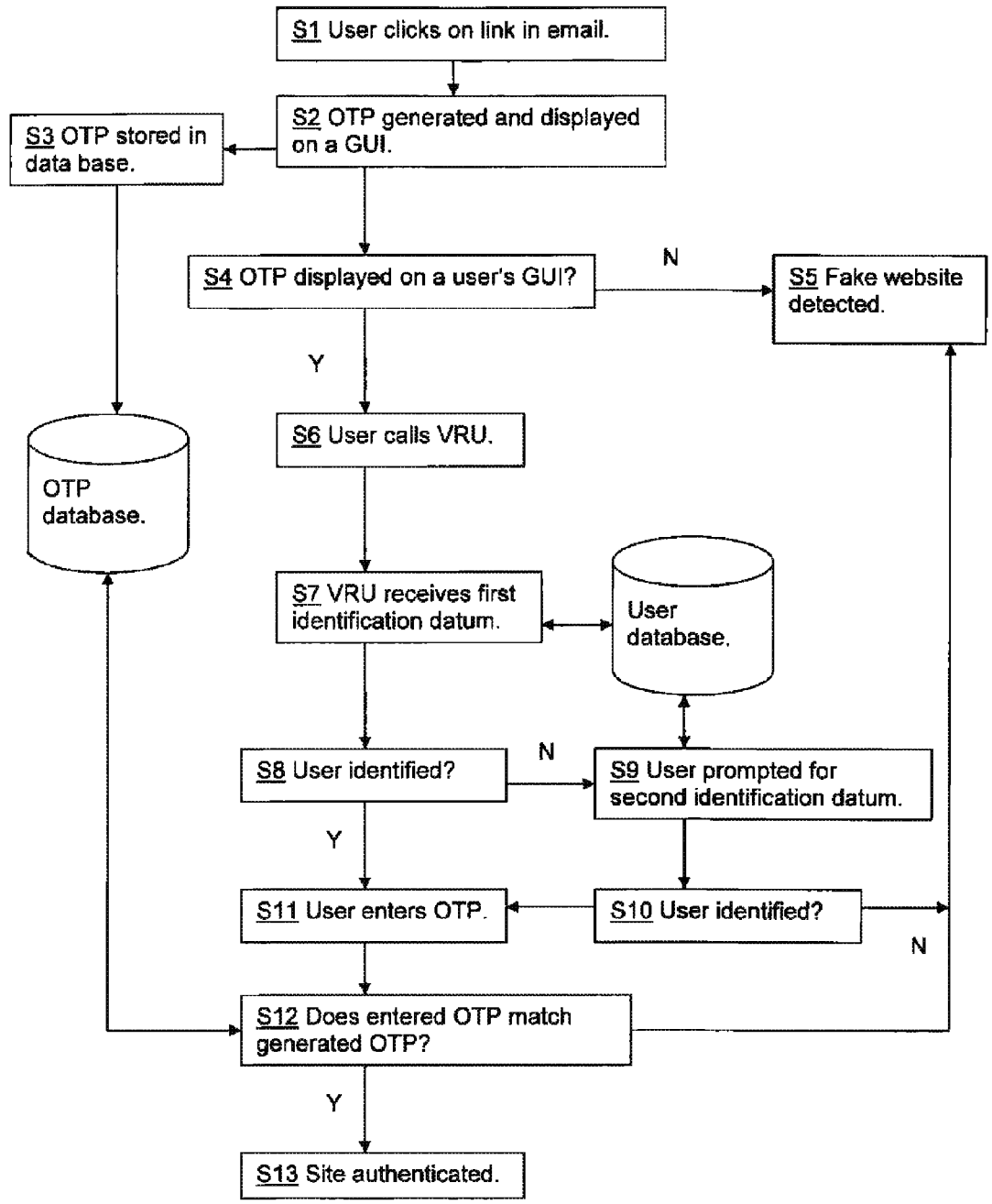
FIG. 2 is a flow chart of one embodiment of the main steps for website authentication in accordance with this invention.

Referring now to FIG. 2, one embodiment of the process of website authentication as defined by the present invention is described. The process starts at S1 when user 16 clicks on a link in an email. Email is a common method for disseminating fake websites for purposes of deceiving users 16 into conveying proprietary, personal and/or secure information. Clicking a link in an email is illustrative, the teachings of the invention apply to any means of a user 16 accessing a website.

After the website is accessed, at S2 an OTP is generated and displayed on a GUI 32. Both an authentic website and a fake website could generate an OTP and display the OTP on a GUI 32. At S3 the generated OTP is stored in a database 30. If at S4 an OTP is not displayed on a user's GUI 32 then at S5 a fake website has been detected by the user 16. If at S4 an OTP is displayed, then at S6 user 16 telephones the VRU 24.

At S7 VRU 24 receives a first identification datum. First identification datum may be an identification datum automatically generated by the communication device 34. At S8, user identity is verified by comparing the first identification datum with known information in the database 30. If at S8 the user 16 is identified, then at S11 the user 16 will enter the OTP displayed on the GUI 32. If at S8 the user 16 is not identified, then at S9 the user 16 may be prompted for the second identification datum. Second identification datum may include, for example, an account number, a password, a personal identification number, date of birth, Social Security number or any number of identification data that would be previously stored in the database 30. If at S10 the second identification datum matches information in the user database, then user is identified. If at S10 the second identification datum does not match information in the user database, then user 16 is not identified. Second identification datum may include the first geographical location from where the call is being initiated. The second geographical location from the GUI 32 where the website was accessed may be detected and stored in the database 30. If at S10 the first geographical location matches the second geographical location, then user 16 is identified. If at S10 the first geographical location does not match the second geographical location, then user 16 is not identified. A person skilled in the art will readily recognize that any number of methods for verifying the identity of the user 16 may be used. A person skilled in the art will also recognize that the number of steps of verifying user identity could be added or subtracted depending upon the level of security desired.

At S11, after user 16 is identified, user 16 enters the OTP that is displayed on the website being accessed. The entered OTP is compared with the generated OTP in the database S12. If the entered OTP matches the generated OTP then the website is authenticated S13. If the entered OTP does not match the generated OTP then a fake website is detected S5.

Referring again to FIG. 1, a person skilled in the art will readily recognize that in the event of website authentication any number of communications could be generated to the user through the website on the GUI 32 or communication device 34. In the event of a fake website being detected, any type of communication or warning could be generated to the user on the communication device 34 (as the website being viewed by the user 16 would be a fake website). Once the user 16 received such a communication, the user 16 could immediately terminate interaction with the website.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 36 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system 10 comprising a website authentication system 20 could be created, maintained and/or deployed by a service provider that offers the functions described herein for customers.

It is understood that in addition to being implemented as a system and method, the features may be provided as a program product stored on a computer-readable medium, which when executed, enables computer system 10 to provide a website authentication system 20. To this extent, the computer-readable medium may include program code, which implements the processes and systems described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 18 and/or a storage system.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer readable medium according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams can be implemented by special purpose hardware-based systems which perform the specified functions or acts, or combinations of special purpose hardware and computer instructions.

As used herein, an element or step recited in the singular and proceeded with the word "a" or "an" should be understood as not excluding plural elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for website authentication, using at least one computer hardware device for performing the steps of:
   receiving a request from a user to view a website within a graphical user interface (GUI);
   generating, in response to the receiving a request, a one time password (OTP);
   storing the generated OTP in a database;
   displaying the generated OTP on the GUI over a first channel;
   communicating a number for the user to call on a communication device over a second channel;
   verifying an identity of the user by receiving an identification datum from the communication device, wherein the user sends, in response to the displaying, the identification datum using the communication device, wherein the verifying compares the identification datum with a stored identification datum in the database, wherein the identification datum is at least one of a caller ID, an account number, a password and a first geographical location;
   determining a second geographical location from the request from the user to view the website and storing the second geographical location in the database;
   receiving, in response to the verifying, an entered OTP from the user;
   comparing the entered OTP with the generated OTP; and
   communicating whether the website is authenticated.

2. The method of claim 1, wherein the identification datum includes at least one of an identification datum automatically generated by the communication device and an identification datum input by the user.

3. The method of claim 1, wherein the communicating includes at least one of storing a fake website in the database and alerting an authentic website administrator of the fake website.

4. A website authentication system, including a computer hardware device comprising:
   a one time password (OTP) generator system for receiving a request from a user to view a website within a graphical user interface (GUI), generating, in response to the receiving a request, a OTP, and displaying the generated OTP on the GUI over a first channel;

a system for communicating a number for the user to call on a communication device over a second channel;

a voice response unit (VRU) system for receiving at least one identification datum from a communication device, wherein the user sends, in response to the displaying, the identification datum using the communication device;

a user verification system for verifying an identity of the user by receiving an identification datum from the communication device, wherein the identification datum includes at least one of an identification datum automatically generated by the communication device and an identification datum input by the user, wherein the identification datum is at least one of a caller ID, an account number, a password and a first geographical location, and wherein the OTP generator system determines a second geographical location from the request from the user to view the website and storing the second geographical location in the database;

a comparison system for receiving, in response to the verifying, an entered OTP from the user and comparing the entered OTP with the generated OTP; and a security alert system for communicating whether the website is authenticated.

5. The system of claim 4, wherein the comparison system communicates whether the website is authenticated.

6. The system of claim 4, wherein the OTP generator system stores the generated OTP in a database.

7. The system of claim 4, wherein the verification system compares the identification datum with a stored identification datum in the database.

8. The system of claim 4, wherein the communicating includes at least one of storing a fake website in the database and alerting an authentic website administrator of the fake website.

9. A non-transitory computer readable medium storing a program product including program code for website authentication, which when executed by a computing device, is operable to carry out a method comprising:

receiving a request from a user to view a website within a graphical user interface (GUI);

generating, in response to the receiving a request, a one time password (OTP);

storing the generated OTP in a database;

displaying the generated OTP on the GUI over a first channel;

communicating a number for the user to call on a communication device over a second channel;

verifying an identity of the user by receiving an identification datum from a communication device, wherein the user sends, in response to the displaying, the identification datum using the communication device, wherein the verifying compares the identification datum with a stored identification datum in the database, wherein the identification datum is at least one of a caller ID, an account number, a password and a first geographical location;

determining a second geographical location from the request from the user to view the website;

receiving, in response to the verifying, an entered OTP from the user;

comparing the entered OTP with the generated OTP; and communicating whether the website is authenticated.

10. The program product of claim 9, wherein the identification datum includes at least one of an identification datum automatically generated by the communication device and an identification datum input by the user.

* * * * *